Jan. 1, 1963

J. VANI 3,070,821

VEHICLE WASHER

Filed Aug. 22, 1960

INVENTOR:
James Vani,
BY
Bair, Freeman & Molinare
ATTORNEYS.

Jan. 1, 1963 J. VANI 3,070,821
VEHICLE WASHER
Filed Aug. 22, 1960 2 Sheets-Sheet 2

INVENTOR:
James Vani,
BY
Blair Freeman & Molinare
ATTORNEYS.

United States Patent Office 3,070,821
Patented Jan. 1, 1963

3,070,821
VEHICLE WASHER
James Vani, Midlothian, Ill., assignor to Service Metal Fabricators, Inc., Chicago, Ill., a corporation of Illinois
Filed Aug. 22, 1960, Ser. No. 51,170
4 Claims. (Cl. 15—21)

This invention relates to a vehicle washer and more particularly to apparatus for washing lower side panels of automobiles.

Mechanical washing systems as known today are capable of effecting efficient cleaning of most parts of an automobile body. One area which is not effectively cleaned in automobiles of modern design is that of the lower side panels which generally curve inward and are not fully reached by the usual vertical side brushes.

It is accordingly one object of the present invention to provide a vehicle washer in which brushes are employed positioned at an angle to the vertical and movable into engagement with the lower side portions of a vehicle body to reach under and effectively clean the lower side panels thereof.

According to a feature of the invention, the brushes are supported for swinging to and from the sides of the vehicle body as it passes a cleaning station at which they are mounted and are adjustable angularly in two planes so that the angle at which they engage the vehicle body can be accurately adjusted for maximum cleaning. Preferably also the length of the swinging arm on which the brush is supported is adjustable to accommodate vehicles of different widths or different conditions of installation.

The above and other objects and features of the invention will be more readily apparent from the following description when read in connection with the accompanying drawings, in which.

In washing vehicles, and specifically passenger automobiles, on modern type washing apparatus the automobile passes through the washing apparatus and past a number of different cleaning and drying stations in a straight line on conveyor tracks, or the like. As the automobile passes through the apparatus it is sprayed with water and detergent and is cleaned by rotating brushes being finally rinsed and dried. The apparatus of the present invention is adapted to be installed in a complete washing assembly to clean the lower side panels of the automobiles as they pass through the system.

Figure 1:
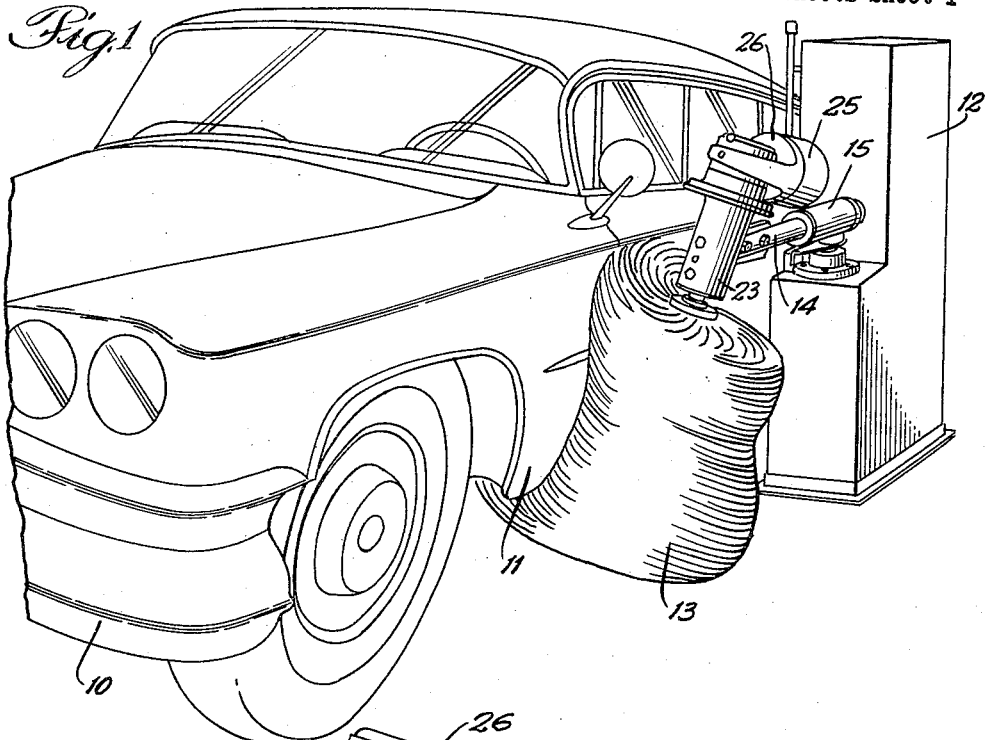
FIGURE 1 is a perspective view illustrating apparatus of the invention in use in washing a vehicle.
Figure 2:
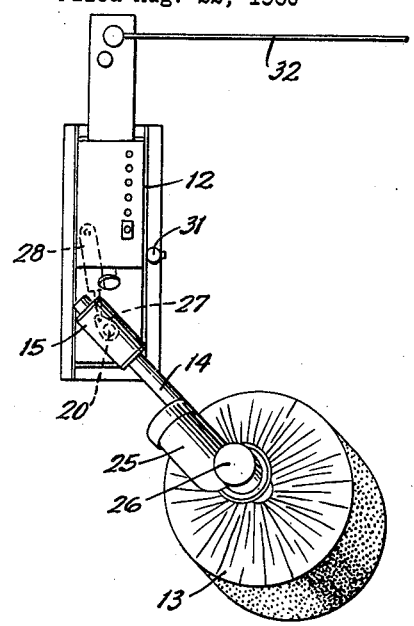
FIGURE 2 is a top plan view showing the apparatus of the invention.
Figure 2:
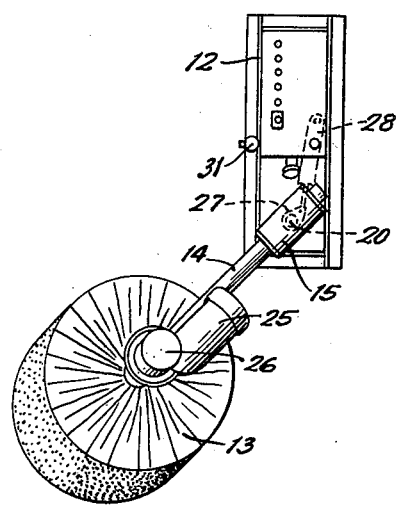
Figure 3:
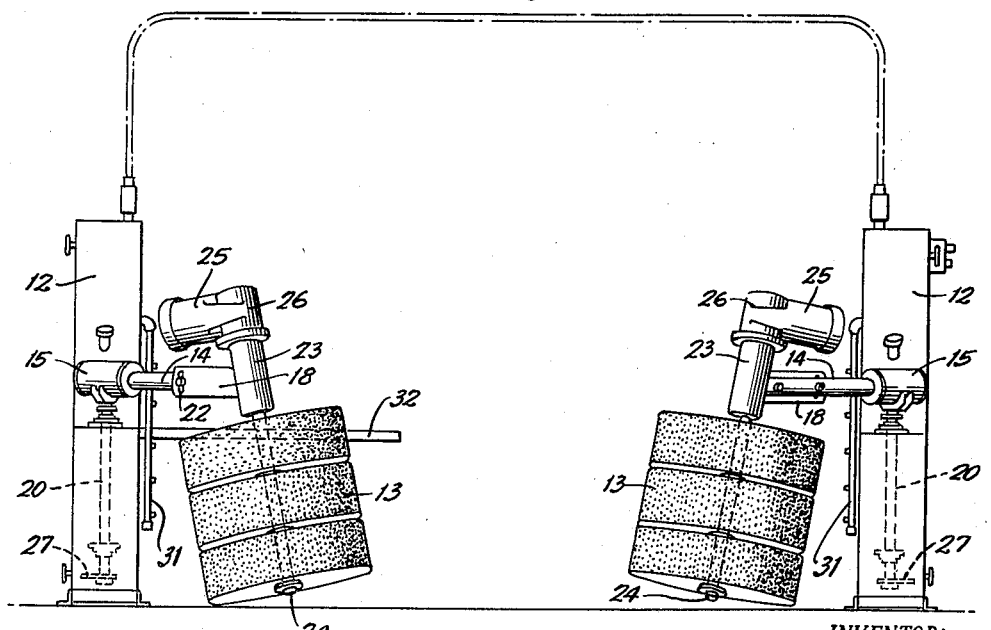
FIGURE 3 is an elevation.

A typical washing operation embodying the apparatus of the invention is illustrated in FIGURE 1 for washing a conventional type automobile indicated generally at 10 having side panels 11 which curve inwardly at the bottom thereof so that they may not properly be reached and cleaned by the usual vehicle side washing brushes. The apparatus for cleaning these lower side panels according to the invention comprises a pair of stands 12 mounted on opposite sides of the path of travel of the vehicle, as shown in FIGURES 2 and 3, and which carry rotary brushes 13 for engaging and cleaning the lower side panels of the vehicle. Since each of the stands and the operating mechanism associated therewith is a duplicate of the other except for being of opposite hand, only one stand will be described in detail.

As seen in FIGURE 1, the brush 13 is carried by a horizontal supporting arm 14 which is swingable about a vertical axis on the stand to move into engagement with the sides of a vehicle to be washed. The brush itself lies at an acute angle to the vertical, preferably being tilted in two different planes, as described hereinafter, so that it will engage the side of the vehicle at an angle thereto which may be roughly parallel to the lower part of the side panel. In this way, the brush will thoroughly clean the side panel and will actually reach under the side panel, as shown in FIGURE 1, to clean the extreme bottom portion thereof effectively.

Figure 4:
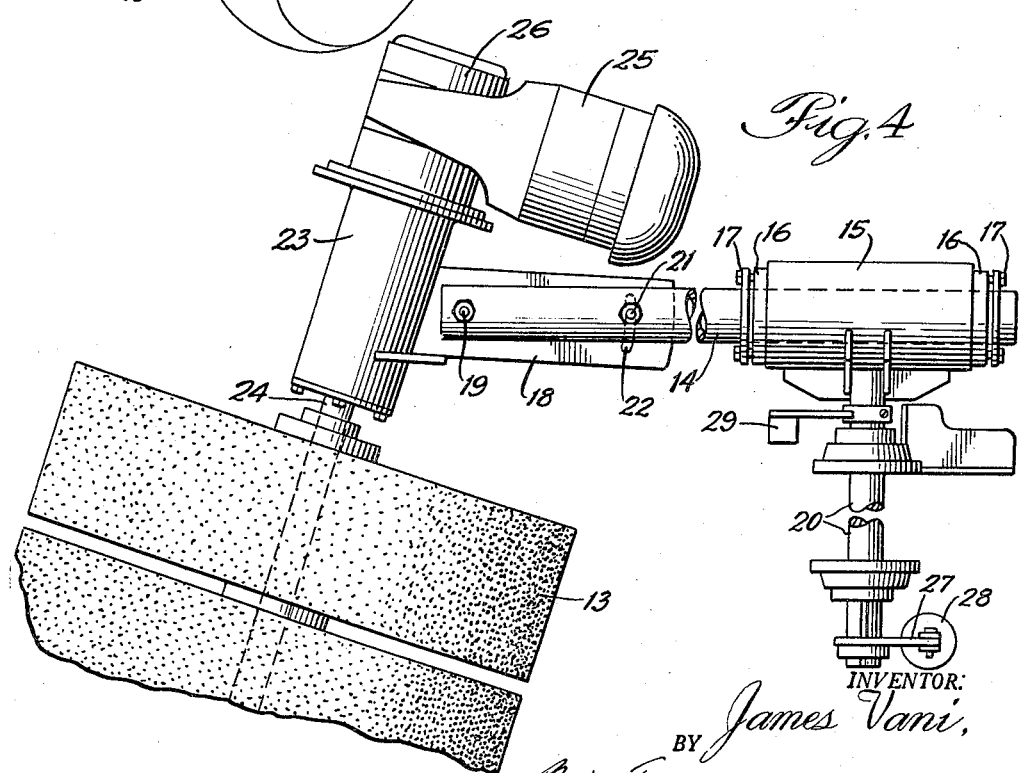
FIGURE 4 is an enlarged side view with parts broken away showing the apparatus of the invention.

Each of the arms 14, as best seen in FIGURE 4, is of cylindrical construction and extends slidably and rotatably through a horizontal head or socket 15 supported on the upper end of a supporting post 20. The head or socket 15 may be a cylindrical tube of larger diameter than the arm 14 and preferably carries tapered bushings 16 which can be drawn up tightly against the arm 14 to clamp it in the desired adjusted position by screws 17. It will be appreciated that any other type of securing means could be employed capable of holding the arm 14 in the desired longitudinal and angular positions required for a particular installation. At its outer end the arm 14 has a second arm 18 pivoted thereto through a bolt 19. A second bolt 21 extends through the arm 14 and through a slot 22 in the arm 18 so that the arm 18 can be adjusted angularly relative to the arm 14. This adjustment can be utilized to adjust the angle of the brush 13 in a plane including the axis of the arm 14 and the arm 14 can be turned in the head 15 to adjust the angle of the brush in a second plane at right angles to the first mentioned plane. In this way, the exact position of the brush can be accurately adjusted for any particular installation and for any general type of vehicles to washed. Also by sliding the arm 14 through the head 15 to a greater or lesser extent, the effective length of the arm 14 can be adjusted so that the brush will engage the vehicle properly and with the arms 14 at an effective angle relative to the vehicle length.

The arm 18 rigidly carries a housing 23 in which a shaft 24 for the brush is journalled. The housing also carries a driving motor 25 and speed reducer 26 through which the shaft 24 is driven to drive the brush at the desired speed and with the requisite power for an effective cleaning operation.

For swinging of the brush toward and away from the vehicle the mounting post 20 is journalled in the stand 12 for rotation about a vertical axis. At its lower end, the mounting post 20 carries an arm 27 to the free end of which there is pivotally connected the piston rod of a fluid motor, such as an air cylinder 28. The other end of the air cylinder 28 is pivoted in the frame so that when air is supplied to the cylinder 28 it will tend to rock the supporting rod 20 in a direction to move the brush 13 into engagement with the side of a vehicle. By this means a proper scrubbing pressure can be maintained against the side of the vehicle so that it will be effectively cleaned by the brush. Movement of the brush in response to the cylinder 28 may be limited by a stop 29 secured to the supporting rod 20 and engageable with a fixed projection on the stand 12.

In addition to carrying the brushes 13 and the mounting and operating means therefor each of the stands 12 may carry spray pipes 31 extending vertically thereof just ahead of the brushes to spray water and detergent on the sides of the vehicle before the brushes move into scrubbing engagement therewith. Operation of the spray means and of the brushes may be controlled by a trip switch 32 adapted to be engaged and operated by a vehicle approaching the cleaning station at which the brushes are mounted.

It will be seen that by the present invention the lower side panels of automobiles and particularly of passenger automobiles which are difficult to reach and clean efficiently are rapidly and effectively cleaned. Due to the adjustability of the apparatus, vehicles of different sizes or types can be efficiently cleaned in various different types of installations.

While one embodiment of the invention has been shown and described herein, it will be understood that it is illustrative only and not to be taken as a definition of the scope of the invention, reference being had for this purpose to the appended claims.

What is claimed is:

1. Washing apparatus for the lower side panels of automobiles comprising a support mounted for free pivotal movement about a vertical axis, a horizontally extending supporting arm, means mounting the supporting arm on the support for angular adjustment about its longitudinal axis, a brush rotatably carried by the free end of the arm with its axis transverse thereto for angular adjustment relative to the arm in a plane passing through the axis of the arm and the axis of the brush, power means connected to the brush for rotating it, and motor means connected to the support to urge it to turn in a direction to press the brush against the side of a vehicle to be washed.

2. The washing apparatus of claim 1 in which the support carries a horizontal housing in which the arm is slidably and rotatably mounted, and means for securing the arm in adjusted position in the housing.

3. Washing apparatus for the lower side panels of automobiles comprising a support freely rotatable about a vertical axis and including a tubular horizontal housing having a horizontal cylindrical opening therethrough, a horizontal cylindrical rod extending slidably and rotatably through the housing, means for securing the rod in adjusted position in the housing, an arm pivoted to the rod on an axis transverse to the length thereof, means for securing the arm in adjusted position about said horizontal axis, a head carried by the arm, a brush shaft journalled in the head and normally lying at an acute angle to vertical, a brush carried by the shaft below the head, and a motor carried by the head and drivably connected to the shaft.

4. The washing apparatus of claim 3 including motor means connected to the support to urge it to turn in a direction to press the brush against the side of a vehicle to be washed.

References Cited in the file of this patent

UNITED STATES PATENTS

| | | |
|---|---|---|
| 2,445,039 | Rusnok | July 13, 1948 |
| 2,513,213 | Schick | June 27, 1950 |
| 2,636,198 | Wilson | Apr. 28, 1953 |
| 2,637,054 | Holmes | May 5, 1953 |
| 2,960,708 | Dear et al. | Nov. 22, 1960 |